US012086921B2

(12) United States Patent
Martikainen (10) Patent No.: US 12,086,921 B2
(45) Date of Patent: Sep. 10, 2024

(54) POSITIONING OF MOBILE DEVICE IN UNDERGROUND WORKSITE

(71) Applicant: SANDVIK MINING AND CONSTRUCTION OY, Tampere (FI)

(72) Inventor: Pekka Martikainen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 53 days.

(21) Appl. No.: 17/761,348

(22) PCT Filed: Sep. 17, 2020

(86) PCT No.: PCT/EP2020/076040
§ 371 (c)(1),
(2) Date: Mar. 17, 2022

(87) PCT Pub. No.: WO2021/053111
PCT Pub. Date: Mar. 25, 2021

(65) Prior Publication Data
US 2022/0343585 A1    Oct. 27, 2022

(30) Foreign Application Priority Data

Sep. 20, 2019  (EP) .................................... 19198779

(51) Int. Cl.
*G06T 15/06* (2011.01)
*E02F 9/20* (2006.01)
(Continued)

(52) U.S. Cl.
CPC .............. *G06T 15/06* (2013.01); *E02F 9/205* (2013.01); *E02F 9/26* (2013.01); *G05D 1/0231* (2013.01); *G05D 1/0274* (2013.01); *G06T 17/20* (2013.01)

(58) Field of Classification Search
None
See application file for complete search history.

(56) References Cited

U.S. PATENT DOCUMENTS 7,069,124 B1 *  6/2006  Whittaker ............ G05D 1/0274
                                                        701/28
2012/0194644 A1 *  8/2012  Newcombe ............... G06T 7/20
                                                        348/46

(Continued)

FOREIGN PATENT DOCUMENTS

EP          3094806 A1 *  11/2016  ............. E21B 7/025
WO      2007012198 A1     2/2007
WO      2011141619 A1     11/2011

OTHER PUBLICATIONS

Gao Fenguy et al: "An efficient Ray-triangle intersection algorithm for tunnel models", Proceedings of the 2015 third international conference on computer, communication, control and information technology (C3IT), IEEE, Feb. 7, 2015, pp. 1-6.

*Primary Examiner* — Diane M Wills
(74) *Attorney, Agent, or Firm* — Corinne R. Gorski (57) ABSTRACT

A method is provide, which includes the steps of receiving a three-dimensional tunnel model of an underground tunnel system of a worksite, receiving two-dimensional position data having sets of x coordinate values and y coordinate values of a mobile device in the underground tunnel system, performing a vertical plane ray cast operation in the tunnel model at a mobile device position defined by an x coordinate value and an y coordinate value in the received position data, and determining a z coordinate value for the mobile device position on the basis of the ray cast operation and at least one earlier resolved z coordinate value for a preceding mobile device position.

15 Claims, 6 Drawing Sheets

(51) Int. Cl.
*E02F 9/26* (2006.01)
*G05D 1/00* (2024.01)
*G06T 17/00* (2006.01)
*G06T 17/20* (2006.01)

(56) References Cited

U.S. PATENT DOCUMENTS

2014/0267618 A1* 9/2014 Esteban ............... H04N 23/951
                                                    348/46
2018/0340794 A1* 11/2018 Okamoto ........... G01C 21/3822
2019/0096080 A1* 3/2019 Liu ....................... B66F 9/0755

* cited by examiner

POSITIONING OF MOBILE DEVICE IN UNDERGROUND WORKSITE

RELATED APPLICATION DATA

This application is a § 371 National Stage Application of PCT International Application No. PCT/EP2020/076040 filed Sep. 17, 2020 claiming priority to EP 19198779.1 filed Sep. 20, 2019.

FIELD

The present invention relates to positioning of a mobile device in underground worksite and particularly for determining vertical plane position of the mobile device.

BACKGROUND

Underground worksites, such as hard rock or soft rock mines, typically comprise a variety of operation zones intended to be accessed by different types of mobile work machines, herein referred to as mobile vehicles. An underground mobile vehicle may be an unmanned, e.g. remotely controlled from a control room, or a manned mobile vehicle, i.e. operated by an operator sitting in a cabin of the mobile vehicle. Mobile vehicles operating in underground work sites may be autonomously operating, i.e. automated or semi-automated mobile vehicles, which in their normal operating mode operate independently without external control but which may be taken under external control at certain operation areas or conditions, such as during states of emergencies. Location tracking for mobile vehicles and persons equipped with positioning devices is required at many worksites.

A location tracking unit (LTU) may determine a location of a mobile vehicle in an underground tunnel on the basis of matching scanning data obtained by one or more scanners in the device to a predetermined model, which may be referred to as an environment model or a tunnel model. The scanning data defines profile of the tunnel wall(s) and the vehicle may be positioned based on finding a corresponding profile in the environment model.

SUMMARY

According to a first aspect of the present invention, there is provided an apparatus, comprising means configured for performing: receiving a three-dimensional tunnel model of an underground tunnel system of a worksite, receiving two-dimensional position data comprising sets of x coordinate values and y coordinate values of a mobile device in the underground tunnel system, performing a vertical plane ray cast operation in the tunnel model at a mobile device position defined by an x coordinate value and an y coordinate value in the received position data, and determining a z coordinate value for the mobile device position on the basis of the ray cast operation and at least one earlier resolved z coordinate value for a preceding mobile device position.

The means may comprise at least one processor; and at least one memory including computer program code, the at least one memory and computer program code configured to, with the at least one processor, cause the performance of the apparatus.

According to a second aspect of the present invention, there is provided a method for modelling a underground tunnel system, comprising: receiving a three-dimensional tunnel model of an underground tunnel system of a worksite, receiving two-dimensional position data comprising sets of x coordinate values and y coordinate values of a mobile device in the underground tunnel system, performing a vertical plane ray cast operation in the tunnel model at a mobile device position defined by an x coordinate value and an y coordinate value in the received position data, and determining a z coordinate value for the mobile device position on the basis of the ray cast operation and at least one earlier resolved z coordinate value for a preceding mobile device position.

According to a third aspect, there is provided an apparatus comprising at least one processing core, at least one memory including computer program code, the at least one memory and the computer program code being configured to, with the at least one processing core, cause the apparatus at least to carry out the method or an embodiment of the method.

In an embodiment according to any of the aspects, a set of z coordinate values associated with tunnel roofs or tunnel floors of tunnels overlapping in the vertical plane is selected, for each of the z coordinate values in the set, deviation to the at least one earlier resolved z coordinate value is determined, and the z coordinate value for the mobile device is selected on the basis of the determined deviations.

In an embodiment according to any of the aspects, the mobile device is a mobile vehicle or a positioning device attachable to or included in a vehicle or portable by a person.

In an embodiment according to any of the aspects, the x, y and z coordinate values are applied to one or more of generate a visualization of the mobile device in the tunnel on the basis of the tunnel model and for controlling autonomous driving of the mobile device.

In an embodiment according to any of the aspects, the apparatus is a server or comprised in a control system further configured to visualize the logical tunnel model on at least one display device.

EMBODIMENTS

The term mine vehicle herein refers generally to mobile work machines suitable to be used in the operation of different kinds of mining and/or construction excavation worksites, such as lorries, dumpers, vans, mobile rock drilling or milling rigs, mobile reinforcement machines, bucket loaders or other kind of mobile work machines which may be used in different kinds of surface and/or underground excavation worksites. Hence, the term mine vehicle is not limited in any way to vehicles only for ore mines, but the mine vehicle may be a mobile work machine used at excavation sites. The term autonomously operating mobile vehicle herein refers to automated or semi-automated mobile vehicles, which in their autonomous operating mode may operate/drive independently without requiring continuous user control but which may be taken under external control during states of emergencies, for example.

Figure 1:
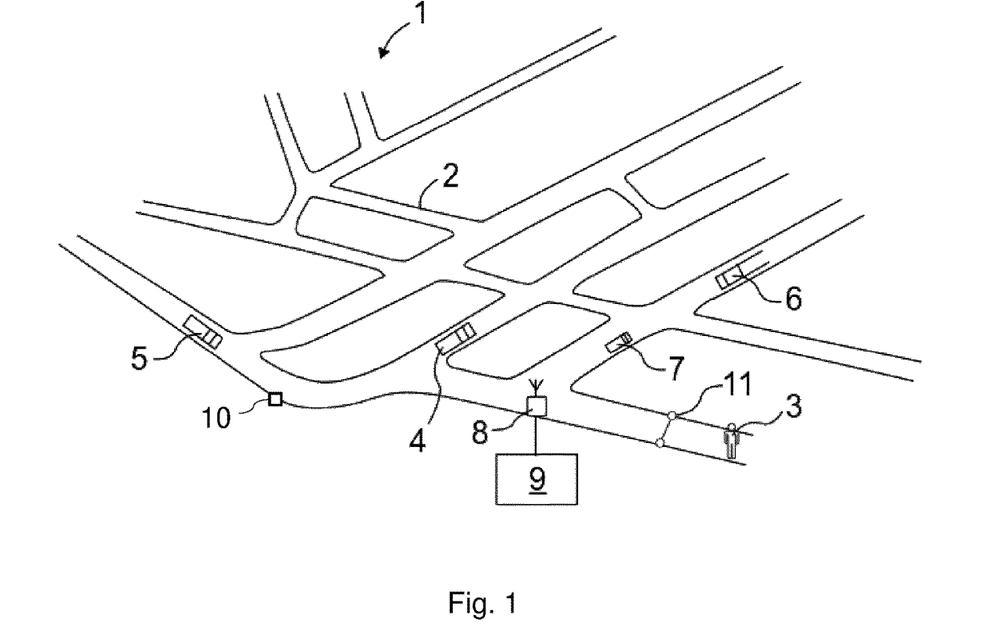
FIG. 1 illustrates an example of an underground work site.

FIG. 1 illustrates a simplified example of a mine worksite 1, in the present example an underground mine comprising a network 2 of underground tunnels. A plurality of mobile objects or devices, such as persons or pedestrians 3 and/or mine vehicles 4, 5, 6, 7 may be present in and move between different areas or operation zones of the worksite 1.

The worksite 1 comprises a communications system, such as a wireless access system comprising a wireless local area network (WLAN), comprising a plurality of wireless access nodes 8. The access nodes 8 may communicate with wireless communications units comprised by the mine vehicles or mobile devices carried by pedestrians and with further communications devices (not shown), such as network device(s) configured to facilitate communications with a control system 9, which may be an on-site (underground or above-ground) and/or remote via intermediate networks. For example, a server of the system 9 may be configured to manage at least some operations at the worksite, such as provide a UI for an operator to remotely monitor and, when needed, control automatic operation operations of the mine vehicles and/or assign work tasks for a fleet of vehicles and update and/or monitor task performance and status.

The system 9 may be connected to a further network(s) and system(s), such a worksite management system, a cloud service, an intermediate communications network, such as the internet, etc. The system may comprise or be connected to further device(s) or control unit(s), such as a handheld user unit, a vehicle unit, a worksite management device/system, a remote control and/or monitoring device/system, data analytics device/system, sensor system/device, etc.

The worksite 1 may further comprise various other types of mine operations devices 10 connectable to the control system 9 e.g. via the access node 8, not in detail illustrated in FIG. 1. Examples of such further mine operations devices 10 include various devices for power supply, ventilation, air condition analysis, safety, communications, and other automation devices. For example, the worksite may comprise a passage control system comprising passage control units (PCU) 11 separating operation zones, some of which may be set-up for autonomously operating mine vehicles. The passage control system and associated PCUs may be configured to allow or prevent movement of one or more mine vehicles and/or pedestrians between zones.

Figure 2:
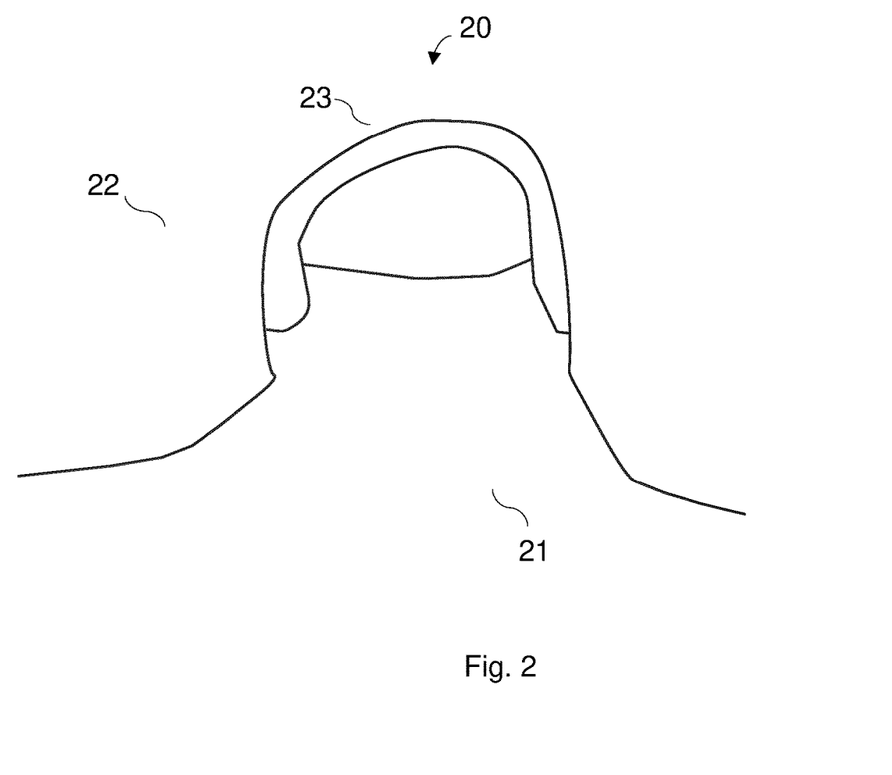
FIG. 2 illustrates a 3D tunnel model of an underground worksite.

FIG. 2 illustrates an example of a 3D model 20 of an underground worksite portion and tunnel thereof, illustrating floor 21, walls 22, and roof 23 of the tunnel. The 3D model may comprise or be formed based on point cloud data generated on the basis of the scanning. The 3D model may be stored in a database accessible by one or more modules of a computing apparatus, such as a mine model processing module, a user interface or visualizer module, a route planning module, and/or a positioning service module. In other embodiments, the 3D model may be a design model or may be generated on the basis of a design model, such as a CAD model, created by a mine designing software or a 3D model created on the basis of tunnel lines and profiles designed in a drill and blast design software, such as iSURE®. Thus, same analysis or processing can be done on measured or initial planned model of the tunnel environment.

Figure 3A:
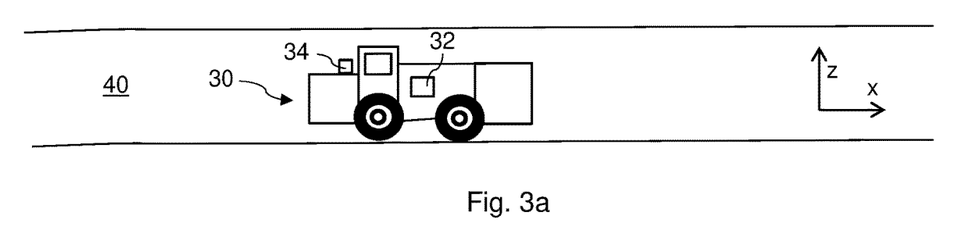
FIGS. 3a and 3b illustrate a mine vehicle in an underground worksite.
Figure 3B:
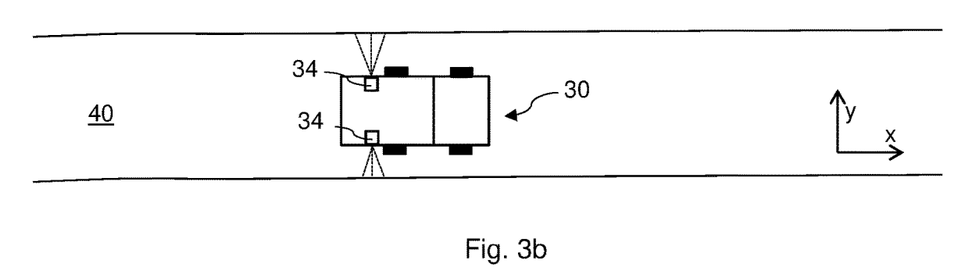

FIGS. 3a and 3b illustrate respectively a side view and a top view of a mine vehicle 30, such as a loader or a load and haul (LHD) vehicle comprising a bucket. The mine vehicle 30 may in some embodiments be an articulated vehicle comprising two sections connected by a joint. However, it will be appreciated that application of the presently disclosed autonomous driving mode features is not limited to any particular type of mine vehicle.

The mine vehicle 30 comprises at least one control unit 32 configured to control at least some functions and/or actuators of the mine vehicle. The control unit 32 may comprise one or more computing units/processors executing computer program code stored in memory. The control unit may be connected to one or more other control units of a control system of the mine vehicle, in some embodiments by a controller area network (CAN) bus. The control unit may comprise or be connected to a user interface with a display device as well as operator input interface for receiving operator commands and information to the control unit.

In some embodiments, the control unit 32 is configured to control at least autonomous operation control related operations, and there may be one or more other control units in the mine vehicle for controlling other operations. It is to be appreciated that the control unit 32 may be configured to perform at least some of the below illustrated features, or a plurality of control units or controllers may be applied to perform these features. There may be further operations modules or functions performed by the control unit(s), e.g. an automatic driving mode selection function, at least one positioning unit/module/function, and/or an obstacle detection function.

The mine vehicle 30 may be unmanned. Thus, the user interface may be remote from the vehicle and the vehicle may be remotely controlled by an operator in the tunnel, or in control room at the mine area or even long distance away from the mine via communications network(s). A control unit outside the mine vehicle 30, for example in the control system 9 may be configured to perform some of the below illustrated features.

The mine vehicle 30 comprises one or more scanning units, or scanners 34, configured to perform scanning of the environment of the mine vehicle. In an embodiment, the scanner 34 may be a 2D scanner configured to monitor tunnel walls at desired height, for example. The control unit 32 may compare operational scanned tunnel profile data to reference profile data stored in an environment model and position the mine vehicle on the basis of finding a match in the environment model to position the mine vehicle and/or correct positioning by dead-reckoning.

The mine vehicle 30 may comprise a location tracking unit, in some embodiment at least partially based on scanning the surroundings of the mine vehicle. Alternatively, the location tracking is performed outside the mine vehicle, such as by an LTU in the control system 9 on the basis of sensor data from the mine vehicle.

In an embodiment, at least some of the features illustrated in WO 2007/012198 are applied for automatic navigation of a mine vehicle. An operator may teach the mine vehicle, either by manually driving or through tele-operation, a route along which the mine vehicle may move without the operator's intervention. A pre-taught reference model, which is used as a basis for route determination, is required on the tunnels in the operating area of the mining vehicle. This reference model may be called an environment model or a tunnel model. The tunnel model may be taught by scanning the tunnels by the mine vehicle or another type of vehicle comprising a scanner. The tunnel model of the operating area having been taught, bound to the coordinate system of the operating area and stored in a data system, the mine vehicle is driven, to teach a specific route needed for a driving task, along said route. The navigation system determines the position of the mining vehicle and locations of route points on the traveled route may be determined in relation to the environment model.

However, it is to be appreciated that pre-taught route is not required but the location may be determined based on the scanning and mapping to the environment model. In an embodiment, position of the mobile vehicle is tracked based on dead-reckoning and direction sensing is applied, and the position is corrected on the basis of scanning.

Some positioning systems provide only 2D horizontal position information, i.e. x and y coordinates values. In many cases, however, production areas comprise several, partly or completely superposed areas, in which case two-dimensional location information is not unambiguous. The vertical position information is also needed to position a mobile device in a 3D model, often available of a mine worksite. There is now provided improved systems for positioning mobile vehicles in underground tunnel system.

Figure 4:
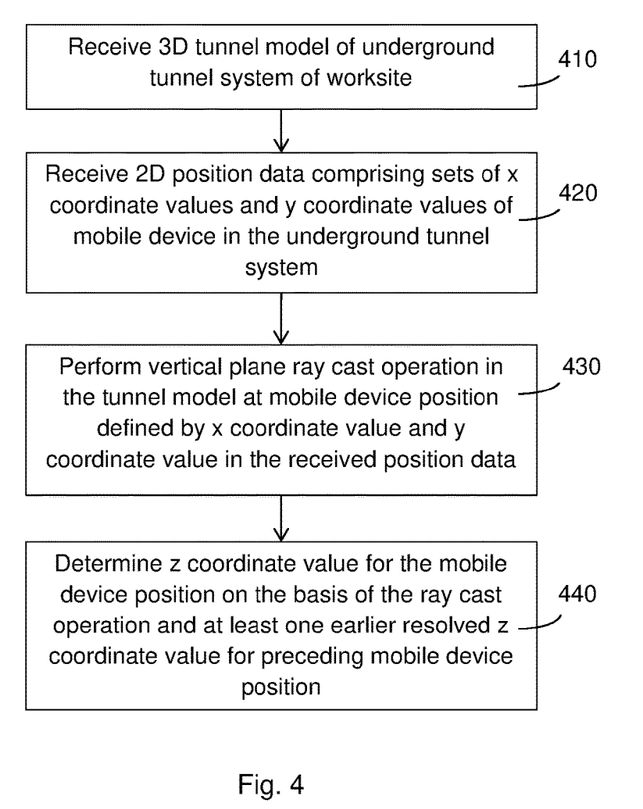
FIG. 4 illustrates methods according to at least some embodiments.

FIG. 4 illustrates a method for mobile device positioning in an underground worksite. The method may be implemented by an apparatus configured for positioning a mobile device and/or processing a model for an underground worksite, such as a server, a worksite operator, designer, or controller workstation, a mobile unit or device, a vehicle on-board control device, or other kind of appropriately configured data processing device.

A 3D tunnel model of an underground tunnel system of a worksite is received 410. 2D position data is received 420. The position data may be referred to as first or horizontal plane position data and comprises sets of x coordinate values and y coordinate values, indicative of a first plane or horizontal position of a mobile device in the underground tunnel system. The mobile device may be (or be comprised by) a mobile vehicle, such as the vehicle 30, or a unit carried out by a person. The sets of x and y coordinate values define the determined 2D path of the mobile device. The tunnel model and the position data may be received from a memory connected or comprised by the apparatus, or from another unit over a communication connection. The position data may be generated by (and received from) 2D LTU configured to monitor position of a mine vehicle or person in the worksite, for example.

A second or vertical plane ray cast operation is performed 430 in the tunnel model. The ray cast operation is performed 430 at a mobile device position defined by an x coordinate value and a y coordinate value in the received position data. A z coordinate value for the mobile device position is determined 440 on the basis of the ray cast operation and at least one earlier resolved z coordinate value for a preceding mobile device position. For example, the earlier resolved z coordinate value may be stored as an outcome of a preceding execution of the method and received together with associated x and y coordinate values.

The z coordinate values are indicative of (second plane or) vertical position of the mobile device in the tunnel system. It is to be noted that the planes may be adjusted in accordance with the applied coordinate system, for example in relation to the mobile device or worksite. The ray cast operation refers generally to a computational ray-surface intersection test. The vertical plane does not have to be exactly to the direction of the normal to the surface of the Earth and the horizontal plane does not have to perpendicular to the normal to the surface of the Earth. The x, y, z coordinate values may but do not need to be Cartesian coordinate values.

It will be appreciated that FIG. 4 illustrates general features related to the underground mobile device z coordinate determination and various additions, options, and/or amendments may be applied, some further embodiments being illustrated below. For example, there is a plurality of options on how z coordinate value for the mobile device position (also referred to below as Zn in the below examples) may be determined 440 based on the earlier resolved z coordinate value (referred to below also as Zn−1).

In some embodiments, the z coordinate value for the mobile device position is determined on the basis of a preconfigured floor and/or roof offset value. Block 440 may comprise determining a distance to a ray intersection point, i.e. a point in which the ray hits a 3D face of the tunnel. The z coordinate value for the mobile device position may be determined on the basis of the determined distance. Preconfigured floor and/or roof offset value(s) may be applied to define the z coordinate value for the mobile device, at the preconfigured distance from the ray intersection point(s). For example, an offset selected in the range between 0.2 to 1.5 meters, e.g. 1 meter, from the floor intersection point may be applied.

Figure 5A:
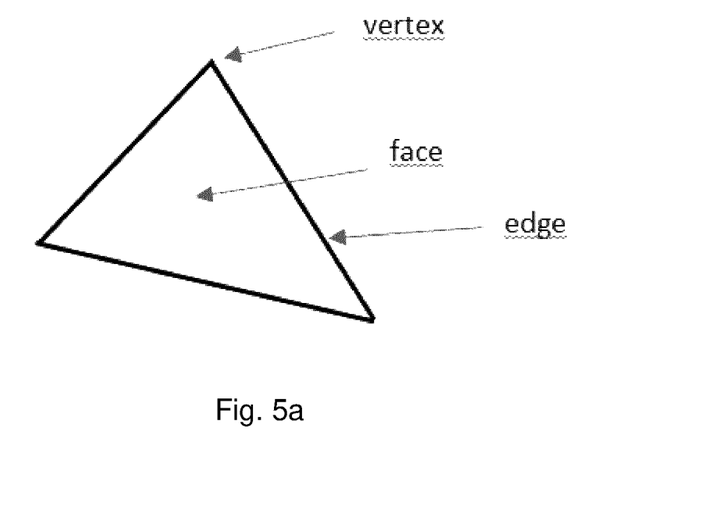
FIG. 5a illustrates a mesh for a mesh tunnel model.
Figure 5B:
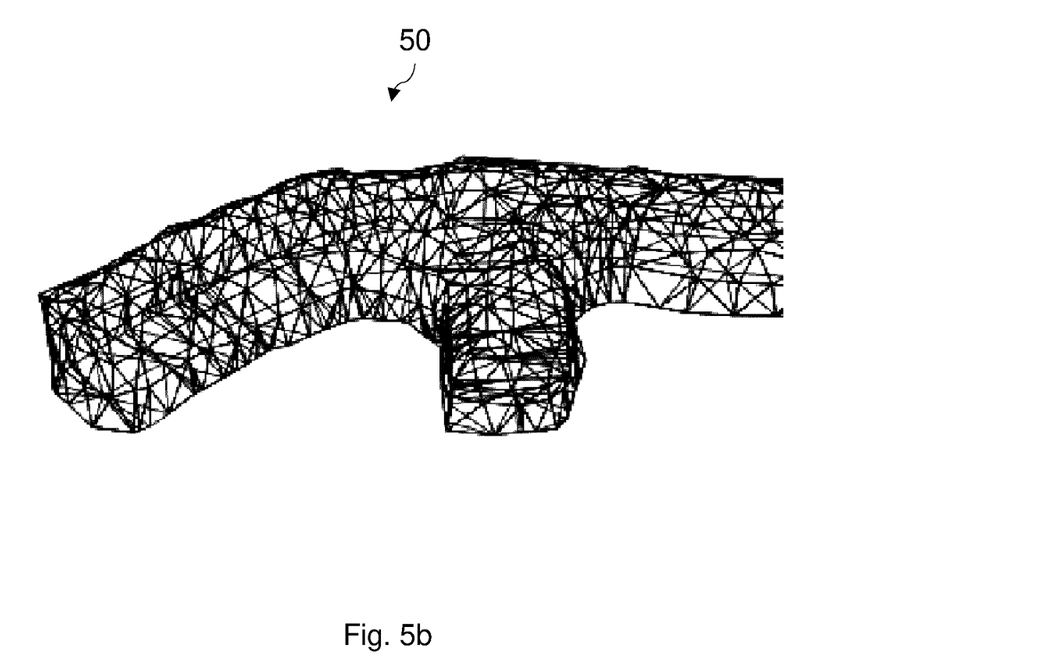
FIG. 5b illustrates a mesh tunnel model.

In some embodiments, with reference to FIGS. 5a and 5b, the tunnel model is a mesh model 50 comprising vertices, edges and faces. The apparatus performing the method of FIG. 4 may thus determine the z coordinate value on the basis of a collision point in which the ray hits a tunnel mesh.

In some other embodiments, the tunnel model is a point cloud model, such as the model 20, and comprises three-dimensional point cloud data. The point cloud data may be generated on the basis of scanning the tunnel. The apparatus performing the method of FIG. 4 may be configured to determine a distance to the tunnel roof or floor at a ray cast direction on the basis of a set of closest/neighbouring points to a ray point being assessed. Simulating the (floor or roof) intersection point may be performed by measuring distances to the neighbouring points at different points of a ray (i.e. at difference ray distances), e.g. every 10 cm. A threshold distance for registering a hit can be may be configured on the basis of density of the point cloud model. A hit, and thus an intersection point, may be registered at a ray point/distance when at least one point (multiple may be required) is closer than the threshold distance. For example, if the point cloud has 2 cm of maximum point density, 10 cm threshold distance has been detected to provide good results.

The ray casting of block 430 results in intersections, which may be x, y, and z coordinates in 3D space. These intersections are used for finding possible z coordinate values for the mobile device position x, y coordinates. When shooting the ray upwards it is assumed that the first intersection is a tunnel floor, the second a tunnel roof, the third a floor and so on.

It is to be appreciated that multiple rays may be applied, preferably their starting points being separated by a configurable distance but sent to equal direction. For example, a plurality of rays in the range 2-20 rays, such as 5 rays may be applied. However, already one ray may be, and has been detected to provide sufficient to have reliable results.

Figure 6:
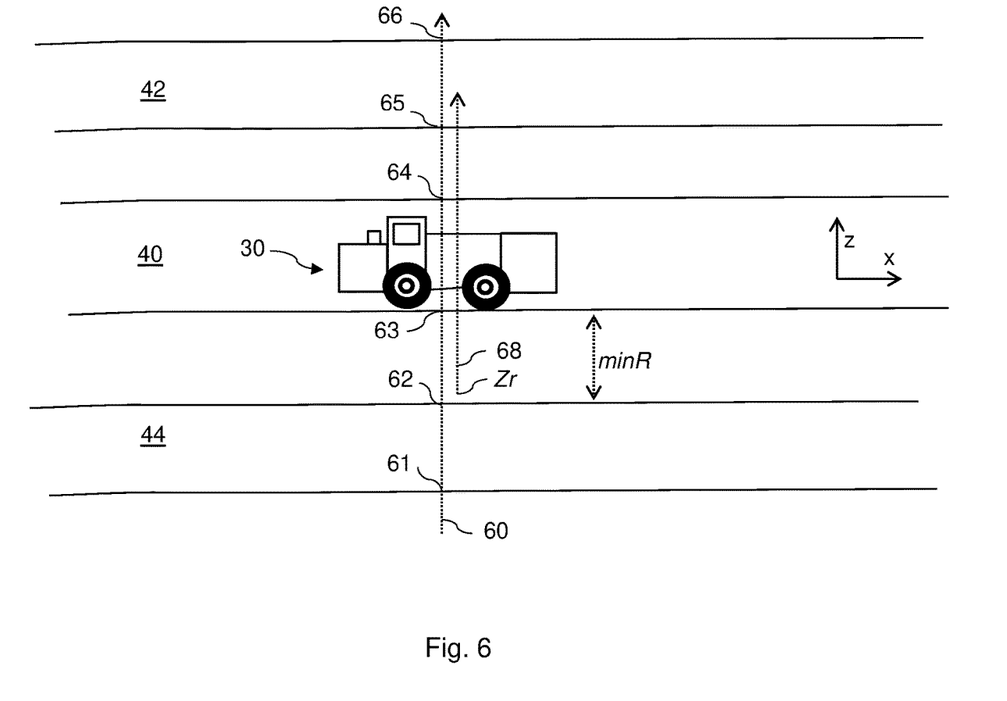
FIG. 6 illustrate ray casting for a mine vehicle in a mine work site with vertically overlapping tunnels.

With reference to the example of FIG. 6, casting of a ray 60 may be applied to find the tunnel floor intersection point 63 directly under the mine vehicle (and/or tunnel roof intersection point 64 directly above the mine vehicle). The ray may be shoot in vertical direction from location X, Y, Zr, where X and Y are coordinate values are determined by a positioning equipment/LTU (and received in block 410) and Zr is the vertical starting point of the ray. The value of Zr may be minus infinity, but in some embodiments determined separately based on the earlier resolved z coordinate value(s).

The actual Z coordinate value of the mobile device (e.g. the mine vehicle 30) position can be assumed to be the Z value of the floor intersection point 63 added with a specified offset value $Z_{offset}$, which could be 1 m above the floor, for example. The position may be resolved as X, Y, $Z_{63}+Z_{offset}$, wherein $Z_{63}$ is the z coordinate value of the floor intersection point 63.

However, as illustrated in FIG. 6, if multiple tunnels 40, 42, 44 are located on the top of each other, the casting of the ray 60 will result more than two intersections 61-66 and the correct floor intersection cannot be resolved.

Whenever the mine vehicle 30 enters the worksite (e.g. to the tunnel 42), plus infinity can be used as Zr and the ray is cast downwards (not illustrated in FIG. 6). In this case the $2^{nd}$ intersection 65 will be the floor intersection. As there cannot be tunnels above the mine entrance the $2^{nd}$ hit can be safely assumed to be the correct intersection.

To address the problem of the multiple intersection points of the overlapping tunnels, the apparatus performing the method of FIG. 4 may be configured to determine starting point Zr of a ray 68 for block 430 on the basis of the earlier resolved z coordinate value(s) and/or select an appropriate intersection point (63 or 64) amongst all detected intersection points 61-66 on the basis of the earlier resolved z coordinate value(s).

In some embodiments only a subset of the points of the 3D tunnel model is applied as an input data set in block 430. Hence, there may be an additional pre-processing or filtering step before block 430. For example, it may be adequate to use reduced resolution or amount of points or reduced number of meshes. The model processing algorithm may be configured to detect and exclude certain portions of the 3D tunnel model that are irrelevant for block 430 on the basis of an associated indication in such data portions.

There may be further qualification or filtering of z coordinate values detected on the basis of the ray cast operation 430.

In an embodiment, the apparatus performing the method of FIG. 4 is further configured to:
  detect a set of z coordinate values associated with tunnel roofs or tunnel floors of tunnels overlapping in the vertical plane,
  determine, for each of the z coordinate values in the set, deviation to the at least one earlier resolved z coordinate value, and
  select the z coordinate value for the mobile device on the basis of the determined deviations.

In an embodiment, horizontal plane distance and/or time between the mobile device position and an earlier determined position of the mobile device is determined. One or more earlier resolved z coordinate values of those determined position of the mobile device, whose horizontal plane distance and/or time does not exceed threshold value(s), are selected for or qualify for the z coordinate determination in block 440. In some cases, this may directly result into only one z coordinate value (which is fresh enough), which may be determined 440 as the z coordinate value.

In some embodiments, the starting point of the ray 68 in the vertical plane is determined on the basis of at least one earlier resolved z coordinate value. Thus, the z coordinate value in this embodiment is defined 440 on the basis of the earlier resolved z coordinate value affecting the ray cast operation 430. In an embodiment, the starting position is defined for the ray cast operation in the tunnel model on the basis of the at least one earlier resolved z coordinate value and a pre-configured minimum distance value indicative of minimum distance between overlapping tunnels. The z coordinate value may then be determined based on the first intersection point (floor or roof, depending on the ray direction) or the second intersection point (roof or floor).

To prevent z coordinates of lower tunnels 44 being detected, the Zr for the ray casting may be configured by selecting z coordinate value which is below the possible floor level 63 but also above the possible tunnel 44 underneath. Thus, Zr will depend on the previously resolved z coordinate value, which may be referred to as Zn−1. In a mine where the tunnels would be substantially horizontal Zr is:

$$Z_r = Z_{n-1} - \min R \qquad (1)$$

where minR is the minimum amount of rock (e.g. in meters) between two overlapping tunnels.

Figure 7:
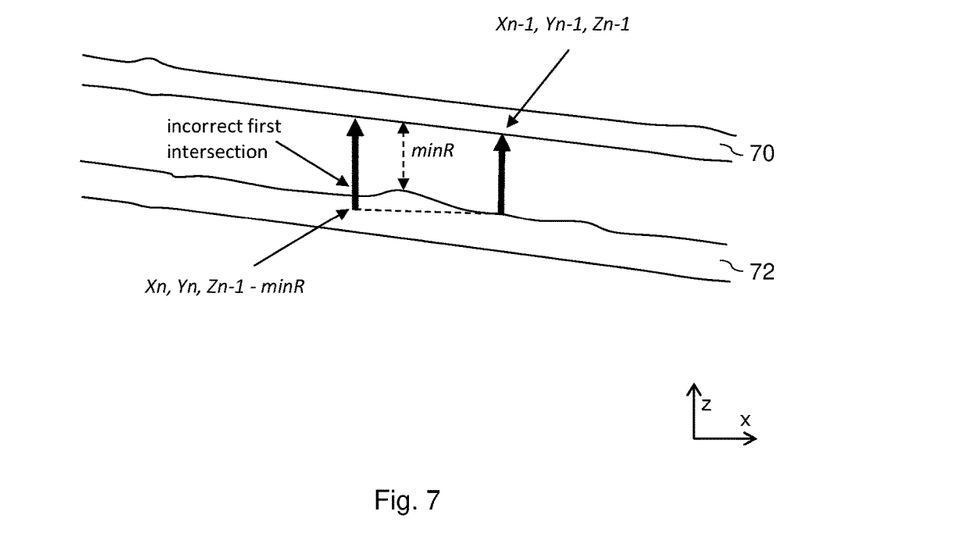
FIGS. 7 and 8 illustrate z coordinate value determination in case of ramps.

With reference to FIG. 7, mines have ramps 70, 72, which are tunnels connecting the levels on different depths. When the mobile device is moving to the left in a ramp 70, using the equation (1) for Zr may result an incorrect intersection.

In some embodiments, a ramp limiter operation is performed for defining the starting point of the ray on the basis of maximum angle for elevation and/or inclination and distance of the mobile device position from the preceding mobile device position in horizontal plane.

Figure 8:
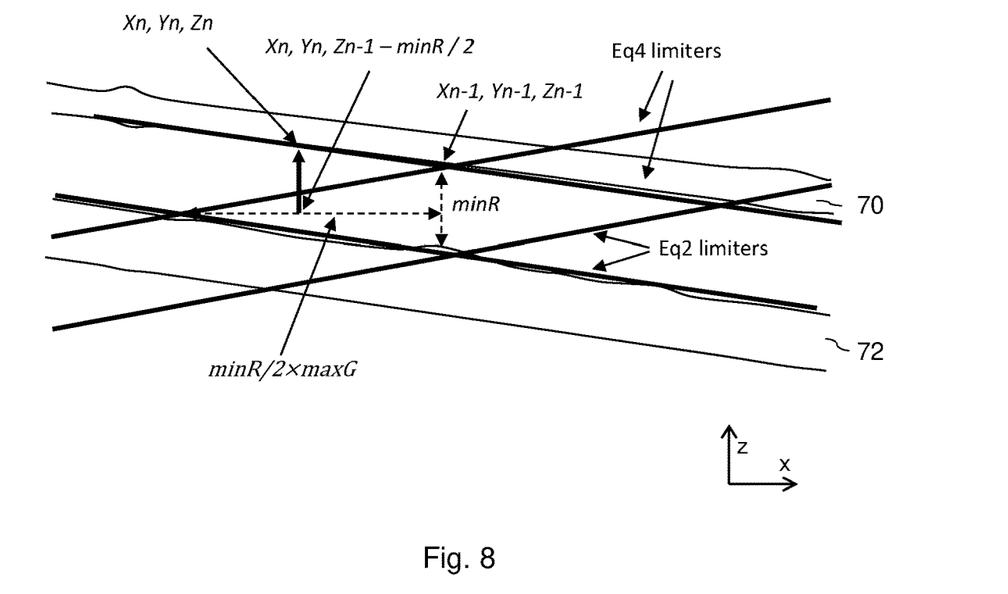

To prevent Zr from being inside or under the possible tunnel underneath, the following requirement may be configured as an uphill ramp Zr limiter (Eq2 limiter in FIG. 8):

$$Zr > Z_{n-1} - \min R + \max G \times dist \qquad (2)$$

where:
  Xn and Yn are the current coordinate values of the mobile device position.
  Xn−1, Yn−1 and Zn−1 are the previous coordinate values of the mobile device position.
  minR is the minimum amount of rock between two vertically overlapping tunnels. For example, minimum value may be configured as 5 meters. This value may be mine specific and can be configured case by case.
  maxG is the maximum gradient of the tunnel. The value is always positive. For example, the value may be set as 0.15 which means 15% maximum gradient.
  dist is the distance in 2D space between Xn, Yn and Xn−1, Yn−1:

$$dist = \sqrt{(X_n - X_{n-1})^2 + (Y_n - Y_{n-1})^2} \qquad (3)$$

At the same time to prevent Zr from being located above the tunnel floor where the mobile device is located, the requirement in equation is also configured:

$$Zr < Z_{n-1} - \max G \times dist \qquad (4)$$

This may define a (downhill) ramp Zr limiter (Eq4 limiter in FIG. 8) and such check is needed in situations where the mobile device is travelling downhill a steep ramp.

These two lines from Equation 1 and 2 meet at the point Xn, Yn, Zr where:

$$Z_r = Z_{n-1} - \frac{\min R}{2} \qquad (5)$$

and the maximum distance between Xn, Yn and Xn−1, Yn−1 is:

$$dist = \frac{minR}{2 \times maxG} \quad (6)$$

Equation (6) may thus be used to define the maximum distance the mobile device may travel between position updates. By using Zr to cast a ray from Xn, Yn, Zr the ray should hit the floor under the mobile device in position Xn, Yn, Zn.

From equation (6) it can be seen that frequent position updates are required depending on the minR and maxG values of the mine. For example, if minR is 5 meters and maxG is 0.15 (15%) maximum distance the mobile device can travel is about 7 meters. After that Zr cannot be reliably calculated as it can be positioned elsewhere than under the tunnel floor where the mobile device is located.

A formula can be derived from the requirements for the maximum time T between each position update for the positioning equipment, when the mobile device is travelling with maxV:

$$T = \frac{minR}{maxG \times maxV} \quad (7)$$

where maxV is the maximum speed in seconds per meter for the machine travelling in a steep ramp For example, if minR is 5 m, maxG is 0.15, and maxV is 4 m/s, T becomes 8.33 s. Thus, the minimum time between each position update is inversely proportional to the current speed of the mobile device, becoming infinity when the mobile device is stopped.

(An optimal) Zn can be resolved by setting Zr:

$$Z_r = Z_{n-1} - \frac{minR}{2}, \quad (8)$$

if the maximum distance requirement between each position update n and n−1 is met:

$$\sqrt{(X_n - X_{n-1})^2 + (Y_n - Y_{n-1})^2} < \frac{minR}{2 \times maxG} \quad (9)$$

If the distance requirement is not met, Zr can not be calculated. In this case the Zr may be set to minus infinity and the next time the ray casting will result only two intersections, Zn can be set as the z coordinate value from the first intersection.

It is to be appreciated that although some example embodiments above illustrated ray casting upwards, alternatively above illustrated features may be applied in connection with downwards ray casting.

The resulting x, y and z coordinate values may be applied as an input for various purposes and application for controlling operations in the worksite 1. For example, the coordinate values may be applied for generating a visualization of the mobile device in the tunnel on the basis of the tunnel model and/or for controlling autonomous driving of a mobile vehicle (being or comprising the mobile device). 3D position indicator for the mobile device position may be generated on the basis of the x, y and z coordinate values.

The mobile device may be displayed based on a 3D position indicator on a 3D map based on the 3D tunnel model. In some embodiments, the 3D position indicator is provided as an input for a collision avoidance system. A navigation application may comprise a positioning unit configured to generate and/or apply the 3D position indicator, and define path/route and/or manoeuvre control for the mobile vehicle.

However, it will be appreciated that the 3D position of the mobile device in the tunnel system may be applied also for various other purposes and applications.

It is to be noted that the tunnel model may be repetitively updated. For example, a drill rig or a load&haul vehicle may be configured to scan their operating area in the tunnel at every round to update the mine model with the excavation progress.

Figure 9:
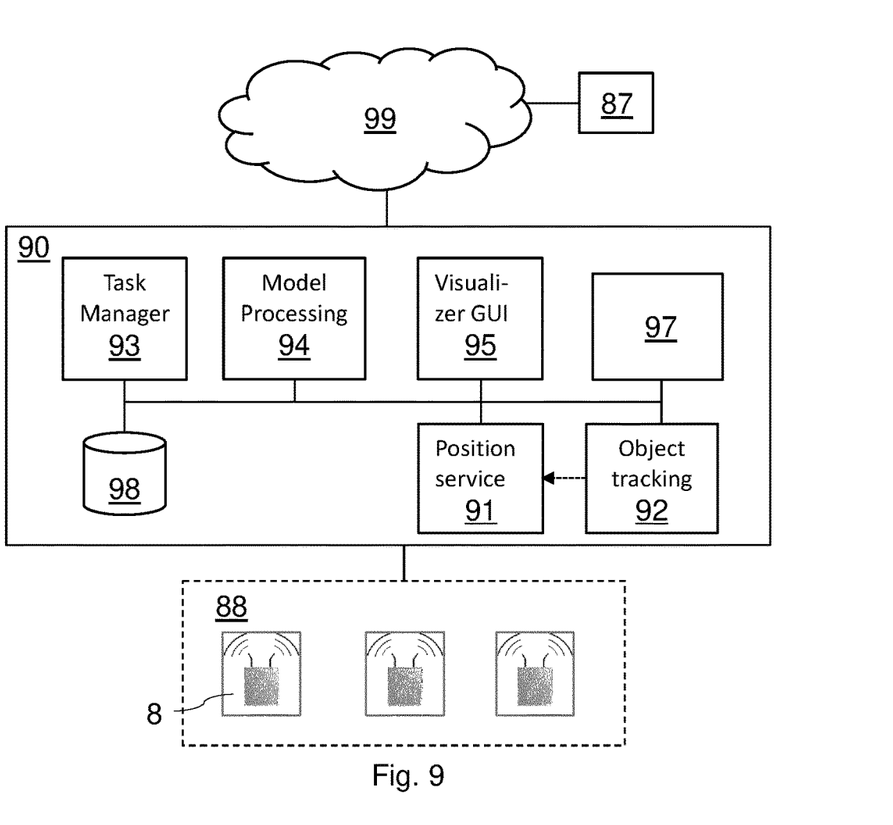
FIG. 9 an example system according to at least some embodiments.

FIG. 9 illustrates an example of a system for underground worksite. The system comprises a wireless access network 88 comprising a plurality of access nodes 8 for wireless communication with communication devices of mobile objects 3-7 in the tunnels. The system comprises a server 90, which may comprise one or more above or underground computing units. The server 90 is configured to perform at least some of the above illustrated features related to mobile object positioning, such as the method of FIG. 4 on the basis of signals received from mobile object(s) via the access network.

FIG. 9 further illustrates operational modules 91-97 of the server 90 according to some embodiments. An object tracking module 92 is configured to perform the method of FIG. 4 and provide the generated 3D coordinate values to one or more of the other modules, in some embodiments a position service module 91.

The server 90 may comprise a task manager or management module 93, which is configured to manage at least some operations at the worksite. For example, the task manager may be configured to assign work tasks for a fleet of vehicles and update and/or monitor task performance and status, which is indicated at a task management GUI.

The server 90 may comprise a model processing module 94, which may maintain one or more models of the underground worksite, such as the 3D tunnel model.

The server 90 may comprise a visualizer GUI module 95, which is configured to generate at least some display views for an operator (locally and/or remotely). In some embodiments, the visualizer GUI module 95 is configured to generate, on the basis of the above illustrated x, y, z coordinate values, a 3D (and/or 2D) view indicating the current position of the mobile device.

The server 61 may comprise further module(s) 97, such as a remote monitoring process and UI, and/or a cloud dispatcher component configured to provide selected worksite information, such as the mobile object position information to a cloud service.

The system and server 90 may be connected to a further system 87 and/or network 99, such a worksite management system, a cloud service, an intermediate communications network, such as the internet, etc. The system may further comprise or be connected to a further device or control unit, such as a handheld user unit, a vehicle unit, a worksite management device/system, a remote control and/or monitoring device/system, data analytics device/system, sensor system/device, etc.

The object tracking 92 may be implemented as part of another module, such as the position service module 91. The position service 91 is configured to provide, upon request or by push transmission, mobile object position information obtained from or generated on the basis of information from the object tracking 92 for relevant other modules or functions, such as the database 98, the visualizer GUI 95, and/or remote units or systems 87 via one or more networks 99. In the example of FIG. 9 the modules are illustrated as interconnected, but it is to be appreciated that not all modules need to be connectable.

The system may comprise or be connected to a vehicle control unit or module for which the floor model and/or position information on the basis of the floor model may be transmitted. The vehicle control unit may be provided in each autonomously operating vehicle and be configured to control at least some autonomous operations of the vehicle on the basis of the 3D location indicators. For example, in response to detecting a person to enter a zone comprising an autonomously operating vehicle, the control unit may be configured to send a control command to stop the vehicle.

An electronic device comprising electronic circuitries may be an apparatus for realizing at least some embodiments of the present invention, such as the main operations illustrated in connection with FIG. 4. The apparatus may be comprised in at least one computing device connected to or integrated into a control system which may be part of a worksite control or automation system.

Figure 10:
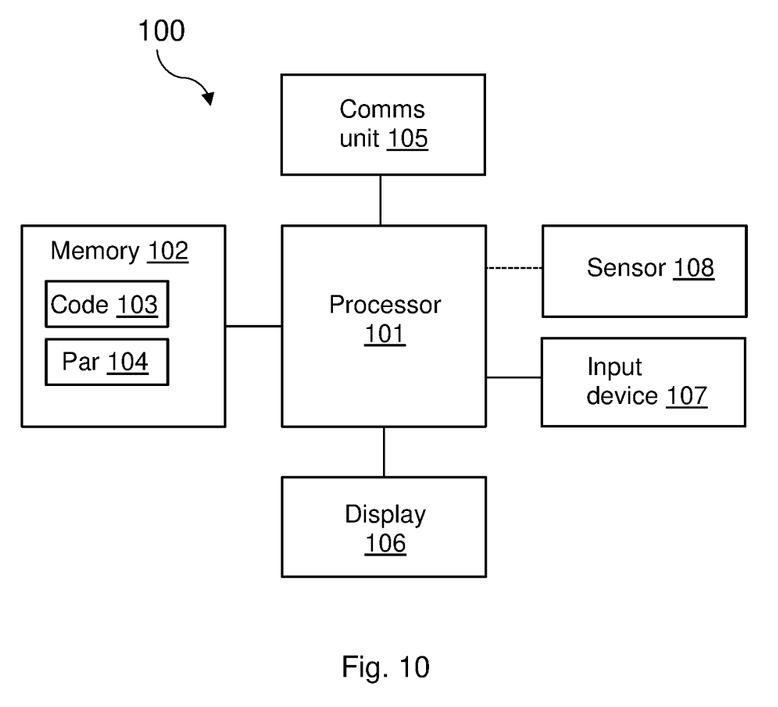
FIG. 10 illustrate an apparatus capable of supporting at least some embodiments.

FIG. 10 illustrates an example apparatus capable of supporting at least some embodiments of the present invention. Illustrated is a device 100, which may be configured to carry out at least some of the embodiments relating to the mobile object position tracking illustrated above. In some embodiments, the device 100 comprises or implements the server 90 and/or the object tracking module 92 of FIG. 9. In another embodiment, the device is comprised or carried by the mobile object 3-7, such as a mobile communications device or a vehicle control unit, configured to carry out at least some of the embodiments relating to the z coordinate value determination illustrated above.

Comprised in the device 100 is a processor 101, which may comprise, for example, a single- or multi-core processor. The processor 101 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 100 may comprise memory 102. The memory may comprise random-access memory and/or permanent memory. The memory may be at least in part accessible to the processor 101. The memory may be at least in part comprised in the processor 101. The memory may be at least in part external to the device 100 but accessible to the device. The memory 102 may be means for storing information, such as parameters 104 affecting operations of the device. The parameter information in particular may comprise parameter information affecting e.g. the ray casting and z coordinate value determination, such as threshold values.

The memory 102 may comprise computer program code 103 including computer instructions that the processor 101 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 100 may comprise a communications unit 105 comprising a transmitter and/or a receiver. The transmitter and the receiver may be configured to transmit and receive, respectively, information in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, and/or Ethernet, for example. The device 100 may comprise a near-field communication, NFC, transceiver. The NFC transceiver may support at least one NFC technology, such as NFC, Bluetooth, or similar technologies.

The device 100 may comprise or be connected to a UI. The UI may comprise at least one of a display 106, a speaker, an input device 107 such as a keyboard, a joystick, a touchscreen, and/or a microphone. The UI may be configured to display views on the basis of the tunnel model(s) and the mobile object position indicators. A user may operate the device and control at least some features of a control system, such as the system illustrated in FIG. 9. In some embodiments, the user may control a vehicle 4-7 and/or the server via the UI, for example to change operation mode, change display views, modify parameters 104 in response to user authentication and adequate rights associated with the user, etc.

The device 100 may further comprise and/or be connected to further units, devices and systems, such as one or more sensor devices 108 sensing environment of the device 100. The sensor device may comprise an LTU, IMU or another type of sensor device configured to determine movements of a mobile object.

The processor 101, the memory 102, the communications unit 105 and the UI may be interconnected by electrical leads internal to the device 100 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising:
   at least one processor and at least one memory including computer program code, the at least one memory and computer program code being configured to, with the at least one processor, cause the apparatus to:
   receive a three-dimensional tunnel model of an underground tunnel system of a worksite;
   receive two-dimensional position data including sets of x coordinate values and y coordinate values of a mobile device in the underground tunnel system;
   perform a vertical plane ray cast operation in the tunnel model at a mobile device position defined by an x coordinate value and a y coordinate value in the received position data; and
   determine a z coordinate value indicative of a vertical position of the mobile device in the tunnel system on the basis of the ray cast operation and at least one earlier resolved z coordinate value for a preceding mobile device position.

2. The apparatus of claim 1, wherein the at least one memory and the computer program code are configured to, with the at least one processor, cause the apparatus is to determine a distance to a ray intersection point and determine the z coordinate value on the basis of the determined distance.

3. The apparatus of claim 1, wherein the at least one memory and the computer program code are configured to, with the at least one processor, cause the apparatus to detect a set of z coordinate values associated with tunnel roofs or tunnel floors of tunnels overlapping in the vertical plane, determine, for each of the z coordinate values in the set, deviation of the z coordinate value from an earlier resolved z coordinate value, and select the z coordinate value for the mobile device from the set of z coordinate values on the basis of the determined deviations.

4. The apparatus of claim 1, wherein the at least one memory and the computer program code are configured to, with the at least one processor, cause the apparatus to determine horizontal plane distance and/or time between the mobile device position and earlier determined positions of the mobile device and qualify for the z coordinate determination of one or more earlier determined positions of the mobile device whose horizontal plane distance and/or time does not exceed a threshold value.

5. The apparatus of claim 1, wherein the at least one memory and the computer program code are configured to, with the at least one processor, cause the apparatus to determine the z coordinate value for the mobile device position on the basis of a preconfigured floor and/or roof offset value.

6. The apparatus of claim 1, wherein the at least one memory and the computer program code are configured to, with the at least one processor, cause the apparatus to define a starting position in the vertical plane for the ray cast operation in the tunnel model on the basis of the at least one earlier resolved z coordinate value and a pre-configured minimum distance value indicative of minimum distance between overlapping tunnels.

7. The apparatus of claim 6, wherein the at least one memory and the computer program code are configured to, with the at least one processor, cause the apparatus to perform a ramp limiter operation for defining the starting point of the ray on the basis of a maximum angle for elevation and/or inclination and distance of the mobile device position from the preceding mobile device position in a horizontal plane.

8. The apparatus of claim 1, wherein the first model is a mesh model having vertices, edges and faces, and wherein the at least one memory and the computer program code are configured to, with the at least one processor, cause the apparatus to determine the z coordinate value on the basis of a collision point in which the ray hits a tunnel mesh.

9. The apparatus of claim 1, wherein the tunnel model includes three-dimensional point cloud data generated on the basis of scanning the tunnel system and wherein the at least one memory and the computer program code are configured to, with the at least one processor, cause the apparatus to determine a distance to a tunnel roof or floor at a ray cast direction on the basis of a set of neighboring points.

10. A method for positioning a mobile device in an underground tunnel system, the method comprising the steps of:
   receiving a three-dimensional tunnel model of an underground tunnel system of a worksite;
   receiving two-dimensional horizontal plane position data having sets of x coordinate values and y coordinate values of a mobile device in the underground tunnel system;
   performing a vertical plane ray cast operation in the tunnel model from a mobile device position defined by an x coordinate value and a y coordinate value in the received position data; and
   determining a z coordinate value indicative of a vertical position of the mobile device in the tunnel system on the basis of the ray cast operation and at least one earlier resolved z coordinate value for a preceding mobile device position.

11. The method of claim 10, further comprising:

detecting a set of z coordinate values associated with tunnel roofs or tunnel floors of tunnels overlapping in the vertical plane;

determining, for each of the z coordinate values in the set, deviation of the z coordinate value from an earlier resolved z coordinate value; and selecting the z coordinate value for the mobile device from the set of z coordinate values on the basis of the determined deviations.

12. The method of claim 10, further comprising:

determining horizontal plane distance and/or time between the mobile device position and earlier determined positions of the mobile device; and qualifying for the z coordinate determination earlier resolved z coordinate values of those determined positions of the mobile device whose horizontal plane distance and/or time does not exceed a threshold value.

13. The method of claim 10, wherein a starting position in the vertical plane for the ray cast operation in the tunnel model is determined on the basis of the at least one earlier resolved z coordinate value and a pre-configured minimum distance value indicative of minimum distance between overlapping tunnels.

14. The method of claim 10, wherein the z coordinate value for the mobile device position is determined on the basis of a preconfigured floor and/or roof offset value.

15. A computer readable medium comprising program code for, when executed in a data processing apparatus, to cause a method in accordance with claim 10 to be performed.

* * * * *